(12) United States Patent
Bryant (10) Patent No.: US 12,025,376 B2
(45) Date of Patent: Jul. 2, 2024

(54) METHOD AND SYSTEM FOR DETECTION OF LOW QUALITY GRAPHITE ELECTRODE ON AN EAF

(71) Applicant: Billy Bryant, Rock Falls, IL (US)

(72) Inventor: Billy Bryant, Rock Falls, IL (US)

( * ) Notice: Subject to any disclaimer, the term of this patent is extended or adjusted under 35 U.S.C. 154(b) by 614 days.

(21) Appl. No.: 17/230,622

(22) Filed: Apr. 14, 2021

(65) Prior Publication Data

US 2021/0333047 A1    Oct. 28, 2021

Related U.S. Application Data

(60) Provisional application No. 63/014,044, filed on Apr. 22, 2020.

(51) Int. Cl.
| | |
|---|---|
| *F27B 3/28* | (2006.01) |
| *F27B 3/08* | (2006.01) |
| *F27D 11/10* | (2006.01) |
| *G01G 5/06* | (2006.01) |

(52) U.S. Cl.
CPC .............. *F27B 3/28* (2013.01); *F27B 3/085* (2013.01); *F27D 11/10* (2013.01); *G01G 5/06* (2013.01)

(58) Field of Classification Search
CPC . G01F 5/06; F27D 11/00; F27D 11/04; F27D 11/10; F27B 3/085; F27B 3/28; H05B 7/06; H05B 7/10; H05B 7/109; H05B 7/152; H05B 7/156
USPC .............................. 373/98, 99, 100, 104–106
See application file for complete search history.

(56) References Cited

U.S. PATENT DOCUMENTS

| | | | | |
|---|---|---|---|---|
| 5,274,664 A | * | 12/1993 | Nigris | H05B 7/156 |
| | | | | 373/105 |
| 6,115,405 A | * | 9/2000 | Brunner | H05B 7/109 |
| | | | | 373/105 |
| 7,313,160 B1 | | 12/2007 | Gerhan | |
| 7,386,369 B1 | | 6/2008 | Gerhan | |
| 7,991,039 B2 | | 8/2011 | Gerhan et al. | |
| 9,439,247 B2 | | 9/2016 | Ingersoll, III | |
| 10,051,694 B2 | | 8/2018 | Bryant | |
| 10,190,821 B2 | | 1/2019 | Bryant | |
| 2005/0034988 A1 | | 2/2005 | Kaschak | |
| 2006/0114963 A1 | | 6/2006 | Gerhan et al. | |
| 2008/0247440 A1 | | 10/2008 | Artman et al. | |
| 2013/0121365 A1 | | 5/2013 | Ingersoll, III | |
| 2014/0328366 A1 | | 11/2014 | Artman et al. | |
| 2015/0204808 A1 | | 7/2015 | Lugo-Flores et al. | |
| 2016/0131428 A1 | | 5/2016 | Bryant | |
| 2020/0355436 A1 | * | 11/2020 | Toniolo | F27D 21/00 |
| 2020/0393199 A1 | | 12/2020 | Bryant | |

\* cited by examiner

*Primary Examiner* — Hung D Nguyen
(74) *Attorney, Agent, or Firm* — Reinhart Boerner Van Deuren P.C.

(57) ABSTRACT

A method for continuous estimation an instantaneous weight of a graphite electrode being consumed in an electric arc furnace. The method includes the steps of continuously sensing a hydraulic pressure acting on a mast holding the graphite electrode; converting each one of the sensed hydraulic pressures to a corresponding weight of the graphite electrode; and determining from the corresponding weights of the graphite electrode the instantaneous weight of the graphite electrode.

21 Claims, 5 Drawing Sheets

METHOD AND SYSTEM FOR DETECTION OF LOW QUALITY GRAPHITE ELECTRODE ON AN EAF

FIELD OF THE INVENTION

This invention relates to electric arc furnaces, systems and methods.

BACKGROUND OF THE INVENTION

Electric Arc Furnaces (EAFs) are used to melt and process materials. The basic operations of EAFs are well known and are described for example in U.S. Patent Application Publication No. 2020/0393199, the entire teachings of which are incorporated herein. Therefore, only a brief description of the EAF structure and production process is outlined to highlight particular aspects of EAFs that are relevant to this disclosure.

An EAF exposes materials to the radiative heat intensity from one (in the case of DC EAFs) to three (in the case of AC EAFs) electric arcs. The electric arc is a plasma with temperatures estimated to be on the order of 15,000° F. (degrees Fahrenheit).

EAFs utilize extreme current magnitudes during melting operations. Steady state current magnitudes greater than 60,000 A (amperes) are common. The large currents are present in the low voltage (secondary) portion of the EAF power system and are conducted using water cooled high current cables, water cooled current conducting aluminum, copper clad electrode arms or bus tube electrode arms and graphite electrodes. In the case of the DC EAF there is a single cable, arm and electrode, and in the case of AC EAFs there are three.

Modern EAFs are refractory lined vessels with water cooled upper and lower shells and roofs. The EAF contains a rotatable gantry assembly that provides structural support for the electrode arms, electrodes, and hydraulic cylinders to lift and lower the electrode arms and electrodes, and also to lift and rotate the water cooled roof, arms and electrodes off of the shell, allowing material to be placed into the EAF (charged) when necessary.

The graphite electrodes protrude through the EAF roof and into the shell during operation. At the start (or restart) of EAF operation, the electrodes must be lowered to the point where the tips are close enough to the scrap for the arc(s) to ignite. Once the arc(s) are formed, the radiative heat rapidly melts the material under and around the electrode tips, resulting in the lengthening of the arc(s), reduction in current and increase in voltage. In order for the arc(s) to not become destabilized, the electrode regulation system opens a hydraulic valve(s) to allow fluid to flow out of the mast hydraulic cylinder(s), lowering the electrode arm and electrode into the material and reducing the arc length.

The electrode regulation system continues to lower the electrode(s) into the material until reaching a liquid pool formed at the bottom of the EAF vessel.

The graphite electrode is consumed during EAF operation and is typically one of the top three costs of EAF steel production. Electrode consumption is usually measured by steel producers in terms of weight of electrode consumed per ton of steel produced.

As the electrode is consumed, the available travel distance between the electrode arm and the gantry is reduced. As the electrode is consumed, the electrode arm will reach a bottom of stroke limit that prevents the electrode from being lowered further. At (or close to) this point in the process, either new sections of graphite must be added to the electrode or the entire column must be exchanged. The method of electrode addition varies by EAF and facility, but generally the entire column is exchanged.

Electrode performance in terms of consumption can vary dramatically between suppliers, electrode production facilities, EAFs and even between production batches at the same facilities. One EAF Production batch (heat) is understood to mean an EAF heating cycle wherein scrap material is put into the EAF vessel (a charge) and the graphite electrode columns are lowered into the EAF vessel to heat the scrap until the scrap is melted and the EAF vessel is tapped to remove the liquid metal. Thereafter, a second charge of steel is placed into the EAF and the foregoing process is repeated.

It is difficult to know in advance with certainty how an electrode will perform on a given EAF, especially from the perspective of the steelmaker. Electrode suppliers provide quality test results for the electrode and graphite material, but despite the industry maturity and best efforts of the suppliers, these metrics do not correlate well with performance in the field.

There is currently no automatic way to continuously measure the weight of an electrode consumed in operation by an EAF. Instead, electrode consumption is manually calculated by steel producers at discrete time intervals, typically weekly in the best case scenarios, to monthly in many cases. The exact methods used to calculate consumption vary between facilities due to several factors, for example, the number of EAFs at the facility, receiving and accounting practices, layout of the facility, ability and willingness of hourly workers to account for electrode additions.

Figure 1:
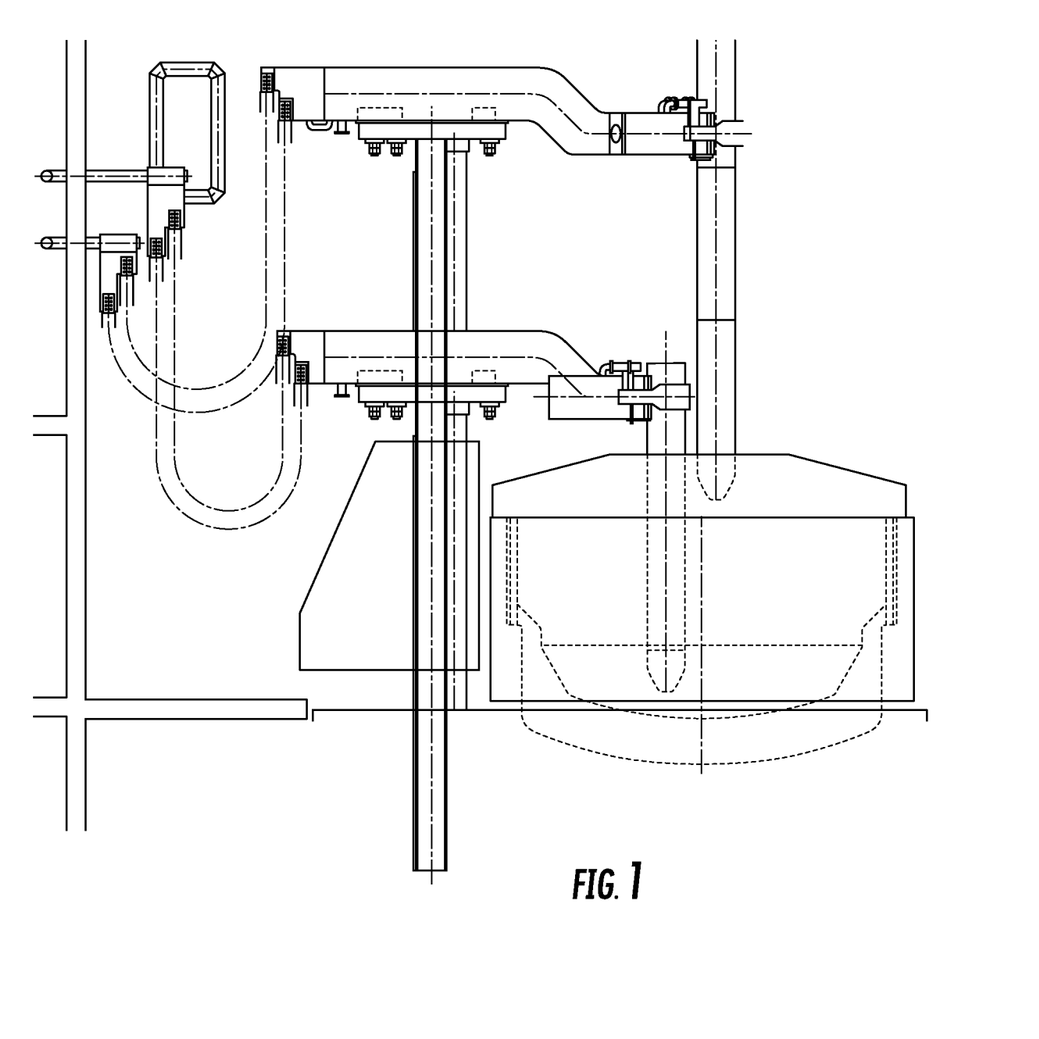
FIG. 1 details an elevation view of a typical EAF.

Steel producers with AC EAFs as seen for example in FIG. 1, normally do not account for electrode additions per-phase. "Per phase" is understood to mean that in an alternating current electric arc furnace there is one electrode for each phase of the alternating current. Each electrode, as readily understood by those familiar with the art, may be made up of multiple sections, that can for example be threaded together to provide for each electrode column. Therefore, as just discussed, typically most steel producers do not account, for each electrode (each phase) that is consumed, but instead combine all three electrodes as if there were only one graphite electrode when they consider electrode graphite consumption.

Accordingly, if there is an equipment issue resulting in increased electrode consumption in one of the phases, the increased consumption is blended into the three phase total, obscuring the issue as to which of the three electrodes may be defective and causing the increased consumption. The increased consumption may be caused by a manufacturing defect of the graphite electrode or inferior materials, that is low quality of materials making up the graphite electrode. Increased consumption may also be caused by for example, mis-configuration of electrode regulation systems, Oxygen injector impingement resulting in increased graphite oxidation and EAF vessel air ingress resulting in increased graphite oxidation.

U.S. Pat. No. 9,439,247 to Wyllys King Ingersoll III, discloses a method for electrode consumption that automatically determines when an electrode has been added to a column. However, the calculation of the consumption of the electrode depends upon use of standard weights for the electrode added and is based on measurements at operational times predicted by measured conditions. The method introduces too many possible errors for electrode consumption and inaccurate electrode consumption results.

BRIEF SUMMARY OF THE INVENTION

Embodiments of the invention provide for a technological advance over existing Electric Arc Furnaces, Electric Arc Furnace Systems, and Electric Arc Furnace methods by providing continuous estimation of graphite electrode weight and consumption for each graphite electrode used in an Electric Arc Furnace in order to detect possible defects in the graphite electrodes in service in the Electric Arc Furnace.

In one aspect, the invention provides a method for the continuous estimation an instantaneous weight of a graphite electrode being consumed in an electric arc furnace. The method includes the steps of continuously sensing a hydraulic pressure acting on a mast holding the graphite electrode. The method includes converting each one of the sensed hydraulic pressures to a corresponding weight of the graphite electrode. The method includes the step of determining from the corresponding weights of the graphite electrode the instantaneous weight of the graphite electrode.

In an embodiment, the method includes the step of storing in a computing device the corresponding weights of the graphite electrode.

In an embodiment, the method includes the step of storing in the computing device the instantaneous weights of the graphite electrode.

In an embodiment, the method includes the step of determining an instantaneous rate of change of the weight of the graphite electrode based upon the stored instantaneous weights the graphite electrode.

In an embodiment, the method includes the step of comparing the instantaneous rate of change of the weight of the graphite electrode to a limit to detect a potential defect of the graphite electrode.

In an embodiment, the method includes the step of providing external notification to an operator if the instantaneous rate of change of the graphite electrode weight exceeds the limit.

In an embodiment, the method includes the step of storing in the computing device the instantaneous rates of change of the graphite electrode in the computing device.

In an embodiment, the method includes the step of applying a statistical filter to the stored corresponding weights of the graphite electrode to continuously derive the instantaneous weight of the graphite electrode.

In an embodiment, the method includes the step of calculating the amount of graphite electrode consumption from the stored instantaneous graphite electrode weights In an embodiment, the amount of graphite electrode consumption is derived from the stored instantaneous graphite electrode weights between two time periods.

In an embodiment, the step of determining the instantaneous rate of change of the weight of the graphite electrode includes applying a statistical filter to continuously derive the instantaneous rate of change of the stored graphite electrode weights.

In an embodiment, the method includes the steps of storing in the computing device the instantaneous rates of change and displaying to a local user the instantaneous rates of change a digital display in communication with the computing device.

In an embodiment, the limit is based upon a normalized rate of electrode consumption.

In an embodiment, exceeding the limit identifies the potential defect in the graphite electrode.

In an embodiment, the graphite electrode is a first graphite electrode of three graphite electrodes in an alternating current electric arc furnace and the method includes the further step of applying the method to each one of the three graphite electrodes.

In an embodiment, the method includes the steps of displaying to a local user the instantaneous rate of change of the graphite electrode and communicating from the computing device to an offsite third party network the instantaneous rate of change of the graphite electrode for display on a digital interface of the third party network.

In an embodiment, the method includes the step of displaying to a local user the instantaneous weight of the graphite electrode and communicating from the computing device to an offsite third party network the instantaneous weight of the graphite electrode for display on a digital interface of the third party network.

In another aspect the invention an electric arc furnace (EAF) system includes an Electric arc furnace, a graphite electrode for each phase of the electric arc furnace, and a mast connected to the graphite electrode. The mast is moveable vertically to raise and lower the at least one graphite electrode. A hydraulic cylinder includes a fluid to raise and lower the mast. A pressure transducer senses a pressure of the fluid. A computing device is programmed to convert the sensed pressure to a weight of the graphite electrode and to determine the instantaneous weight of the graphite electrode.

In an embodiment, the computing device applies a statistical filter to continuously derive the instantaneous weight of each one of the graphite electrodes consumed in operation by the EAF.

In an embodiment, the computing device applies a statistical filter to continuously derive the instantaneous rate of change of each one of the graphite electrodes consumed in operation by the EAF.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred examples, there is no intent to limit it to those examples. On the contrary, the intent is to cover all alternatives, modifications and equivalents as included within the spirit and scope of the invention as defined by the appended claims.

DETAILED DESCRIPTION OF THE INVENTION

The lack of a system and method for continuous automatic measurement of graphite electrode consumption, large variance in electrode quality, inherent EAF process variance and time delay in consumption calculation results in missed opportunities to respond to increases in electrode consumption and increased production costs. The current invention seeks to solve these problems.

By "automatic" it should be understood to mean that there is no measurement taken of the weight or dimensions of an electrode or segment of the electrode before it is placed in operation, such as placing it on a scale or recording its weight in a computing device. Further, there is no recording of the weight of any segment of the electrode, for example, as written on the segment of the electrode by a manufacturer, when it is added to an electrode column. Instead, as will be discussed, during operation, a mast cylinder fluid pressure that corresponds to a weight of the graphite electrode is sensed when the electrode is in operation and thereafter, an instantaneous weight of the graphite electrode is determined as is its instantaneous rate of consumption.

By "continuous" it should be understood to mean that the sensing of the pressure occurs in intervals that may be taken every second or in smaller increments or larger increments as desired with the graphite electrode in use. The smaller the time between the measurements the greater the accuracy but more processor time is required and greater memory for storing the increased data is required. By "instantaneous" it is meant a derived result taken between at least two points in time of the same sensed parameter. For example a mast cylinder pressure may be sensed at a first time and the mast cylinder pressure may be taken at a second point in time. From the two sensed parameters an "instantaneous" result may be derived to provide an estimate the measured parameter at any desired point in time.

Figure 2:
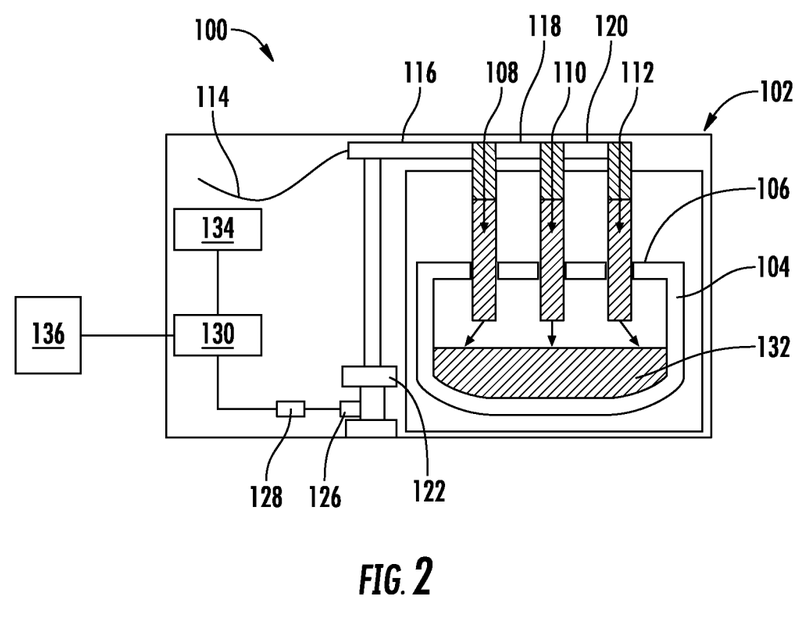
FIG. 2 is a schematic illustration of an EAF system according to the teachings of the instant disclosure.

FIG. 2 is a schematic illustration of an EAF system 100 and an EAF 102 according to an example of the instant disclosure. The EAF system 100 and EAF 102 utilize examples of the methods and processes according to the instant disclosure. The EAF 102 is a refractory-lined vessel 104 covered with a retractable roof 106, through which one or more graphite electrodes 108, 110, 112, enter the EAF 102. Current 114 flows through each of the graphite electrodes 108, 110, 112, when in operation. The EAF is an alternating current electric arc furnace (AC EAF) that has the three graphite electrodes 108, 110, 112, one for each phase of alternating current. While an AC EAF is illustrated, it is not the intent to limit the invention to AC EAF's as the embodiments described are also applicable to DC (Direct Current) EAF's.

As those familiar with the art readily understand, use of the term "per phase" consumption refers here to the consumption of each one of the three electrodes 108, 110, and 112 during operation. As discussed previously, while "per phase" consumption is understood to mean the consumption of each one of the graphite electrodes 108, 110, and 112, typically operators only speak in terms of all three graphite electrodes as a single graphite electrode that is consumed in operation. However, thinking in this way prevents drilling down further to determine which if any of the three electrodes is defective.

By defective it is meant that the graphite electrode 108, 110, 112, may be manufactured poorly, that is incorrectly, or with inferior materials such that the graphite electrodes 108, 110, and 112 are consumed much to fast during operation. As will be discussed, the method disclosed herein is intended to calculate the consumption of each one of the three graphite electrodes 108, 110, and 112 during use. In this way, for example, if the graphite electrode 108 that may have been purchased from a manufacturer in May be compared with graphite electrode 110 that may have been purchased in June. If all other EAF parameters are within operating norms but it is determined that the graphite electrode 110 was consumed in operation at a much faster rate than graphite electrode 108, then it may help the operator to understand that the purchased graphite electrode 110 was defective and warrant reimbursement from the manufacture or distributer who provided the graphite electrode 110. Given the high cost of graphite electrodes in the production of steel, understanding when inferior graphite electrodes 108, 110, 112, have been supplied is of great importance to EAF operators.

The graphite electrodes 108, 110, 112, are each connected to a mast 116, 118, 120 respectively. Only graphite electrode 108 and its mast 116 are discussed herein but it is readily understood by those familiar with the art that the discussion is applicable to each one of the other graphite electrodes 110, 112 and their respective masts 118, 120. Accordingly, because the structures and method for each of the respective graphite electrodes 110, 112 and mast 118, 120 are duplicative of those of electrode 108 and mast 116, they are not discussed herein.

The mast 116 is raised and lowered by a hydraulic cylinder 122 pressurized via a fluid driven by a hydraulic motor 126. A pressure transducer 128 senses the cylinder hydraulic pressure on the mast 116. The pressure transducer 128 includes a converter that continuously converts the hydraulic cylinder pressure into an analog electrical signal that is digitized and transmitted in digital form to software operating on a computing device 130.

The computing device 130 may be a personal computer (PC) with executing system software. By executing system software it is meant common business and engineering software capable of reading text files. While the PC is discussed here as an example, it is not the intent to limit the example to only the PC, as in other examples, a computing device with executing software, processing and memory can be used. Some non-limiting examples are a server, a controller, a processor, a MAC device, or a mobile device. The system software continuously samples and stores the hydraulic cylinder pressure measurements sensed by the pressure transducer 128.

Figure 3:
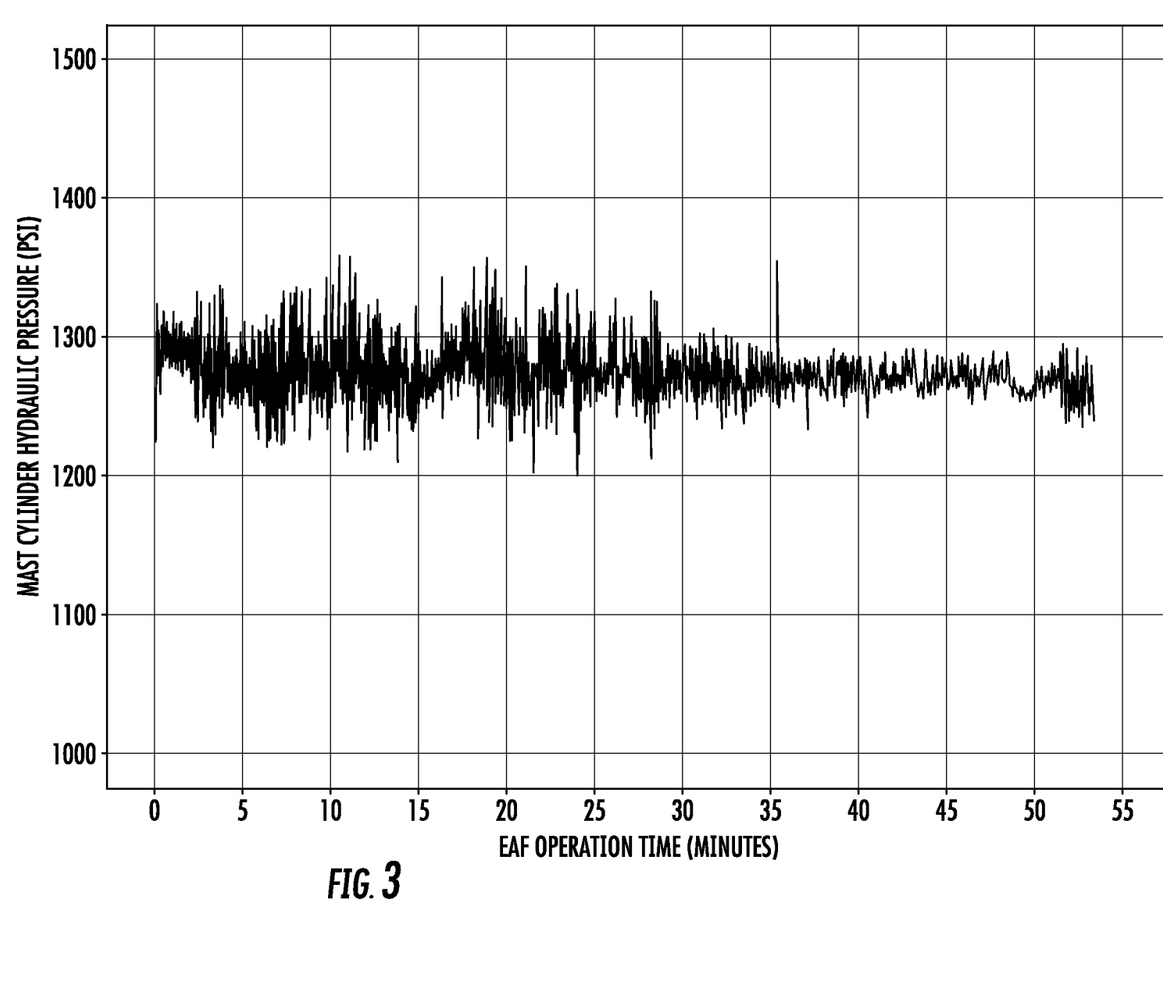
FIG. 3 details an electrode mast hydraulic cylinder pressure measurement from one phase of an AC EAF throughout one EAF production batch (heat).

FIG. 3 details the hydraulic pressure measured from the hydraulic cylinder 122 (FIG. 2) throughout one production EAF batch (one (1) heat). FIG. 3 indicates that the hydraulic cylinder pressure is erratic during operation. This is due to several factors including rapid movement of the hydraulic cylinder 122, movement of the other hydraulic cylinders (not illustrated) on the other phases (for AC EAFs), and main system pressure disturbances, among other factors.

As electrode 108 is consumed, the weight on the hydraulic cylinder 122 decreases resulting in a decrease in statistical central tendency of hydraulic pressure (referred to as hydraulic pressure unless otherwise stated).

The hydraulic cylinder 122 pressure measurement can be translated into a corresponding weight on the hydraulic cylinder 122 using the dimensions of the hydraulic cylinder 122: weight=pressure per area*$\pi$*hydraulic cylinder radius$^2$.

Figure 4:
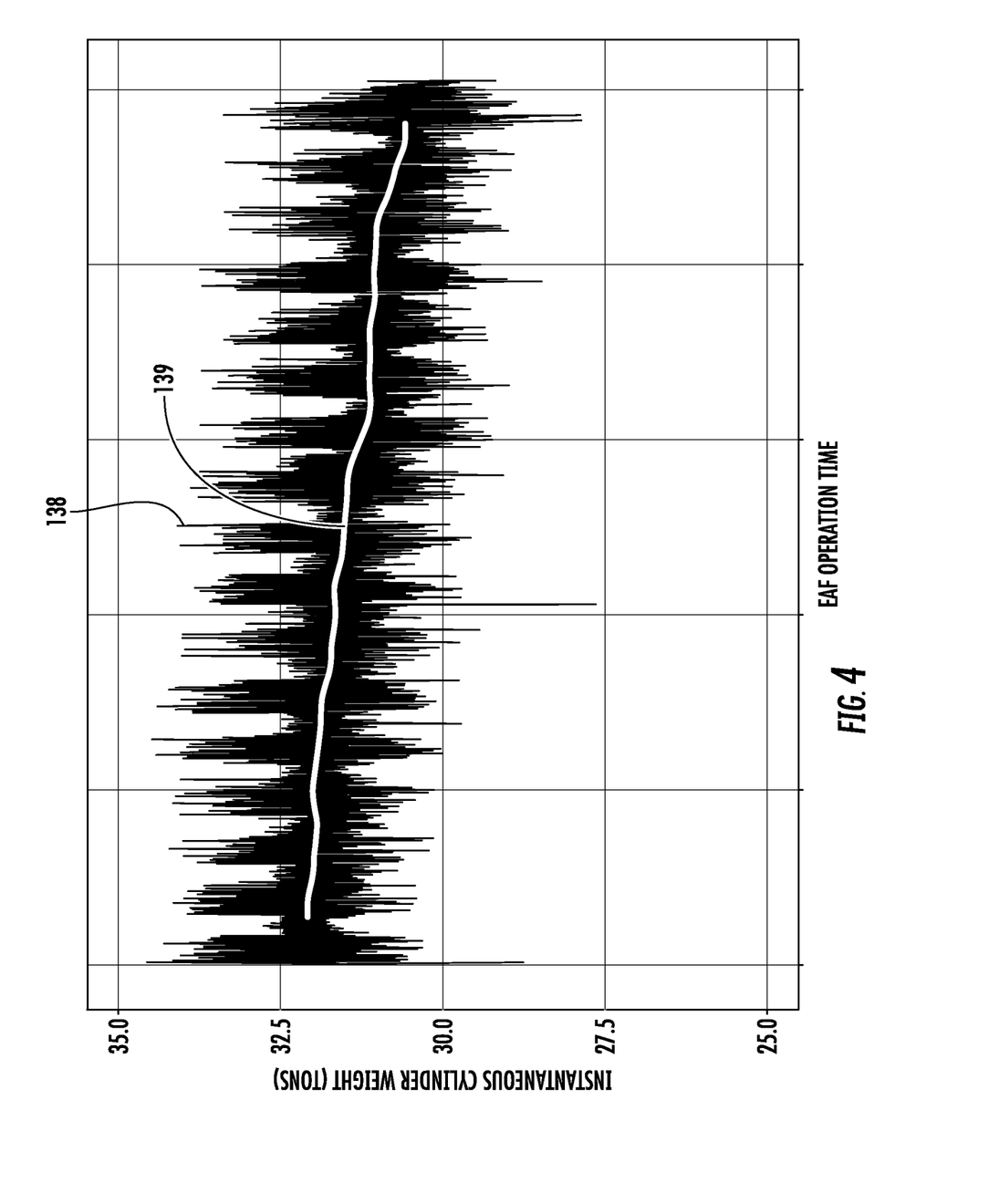
FIG. 4 details an electrode mast hydraulic cylinder pressure measurement throughout several EAF production batches (heats) with statistical filtering overlaid.

FIG. 4 details the conversion of the hydraulic cylinder pressure into a weight in tons over a time period spanning multiple EAF 102 (FIG. 2) heats. The time period spans immediately after the graphite electrode 108 (FIG. 2) was added, until just prior to the next addition of a graphite electrode to replace the consumed graphite electrode 108 (FIG. 2). This time range provides the largest range in weight applied to the hydraulic cylinder 122 (FIG. 2). The trend indicates that the central tendency of the weight decreases at a rate that is nearly constant and linear. As discussed below, the system does not depend upon or require detection of graphite electrode additions in order to estimate change in weight nor are the method's estimations of change in weight limited to discrete periods of EAF operation such as stable flat bath conditions.

FIG. 4 further indicates that the change in the central tendency of the hydraulic cylinder 122 (FIG. 2) weight can be continuously estimated by application of a suitable statistical filter. The output of one possible statistical filter is overlaid. The black lines 138 illustrated represent each sensed pressure that has been converted to a graphite electrode weight. Any number of the graphite electrode weights may be grouped as a sample to derive an instantaneous graphite electrode weight by application of a statistical filter which will be further discussed below.

The instantaneous graphite electrode weight of the consumed graphite electrode 108 (FIG. 2) for a given time period is calculated using the stored weights between two time periods. The total consumed weight is aggregated sequentially from the starting time to the ending time. Only decreases in weight are aggregated into the total. Weight increases measured due to hydraulic system dynamics and the graphite electrode 108 additions to the graphite electrode 108 (FIG. 2) are excluded in the aggregation. The following pseudocode outlines the algorithm of the statistical filter for determination the instantaneous graphite electrode weight:

| 1. | set accum = 0 |
| 2. | for k = 2 to k = N |
| 3. | weight_delta = weight(k) − weight(k-1) |
| 4. | if weight_delta < 0 |
| 4a. | accum = accum + weight_delta |
| 5. | increment k |
| 6. | go to 2 |

The instantaneous graphite electrode weight is aggregated between times, which can be correlated to production batches and converted to a normalized graphite electrode 108 (FIG. 2) consumption rate using process parameters aligned to the aggregation period such as charged tons of scrap 132 (FIG. 2), tapped liquid tons, cast billet tons or energy.

The slope 139 of the statistically filtered weight provides the instantaneous rate of change of the graphite electrode 108, which is referred to as the consumption rate of the graphite electrode 108. The consumption rate can increase due to many factors including low quality graphite electrode, EAF 102 (FIG. 2) ingress air or Oxygen injector impingement resulting in oxidation of the graphite and changes to the power regulation set-points, among other factors.

The calculated consumption rate may be compared to a limit that is typically the consumption rate of a normalized graphite electrode. In this way the actual measurement of the weight of the graphite electrode 108 is not taken before or during operation nor are additions to the graphite electrode 108 added by an operator. Instead, the sensed hydraulic pressure, converted to weight, followed by the application of a statistical filters permits an operator to determine an instantaneous weight and instantaneous rate of change of graphite electrode 108. Where the instantaneous rate of change of the graphite electrode exceeds the expected/normalized rate of change of a normalized graphite electrode, the graphite electrode 108 may be defective, provided all other parameters of the EAF 102 (FIG. 2) are within limits. Accordingly, the operator is given a powerful tool to determine whether the graphite electrode 108 is defective. For further clarity at any given (x,y) coordinate in FIG. 4 taken along the slope 139, the instantaneous weight of the graphite electrode 108 is the y coordinate while the slope 139 at coordinate (x,y) represents the instantaneous rate of change of the graphite electrode 108.

The instantaneous weight at any given time or the instantaneous rates of change of the graphite electrode 108, may be made available to system users (operators) at the steel production facility by a network 134 (FIG. 2) connected to the computing device 130 (FIG. 2) which may include a digital display. The computing device 130 may also be connected to an off site server 136 (FIG. 2) via by way of non-limiting examples, well known in the art, such as the internet. This permits that the instantaneous weight estimate and real time data may be stored offsite, for example at a server and if desired, accessed, viewed and worked with by authorized offsite parties.

Figure 5:
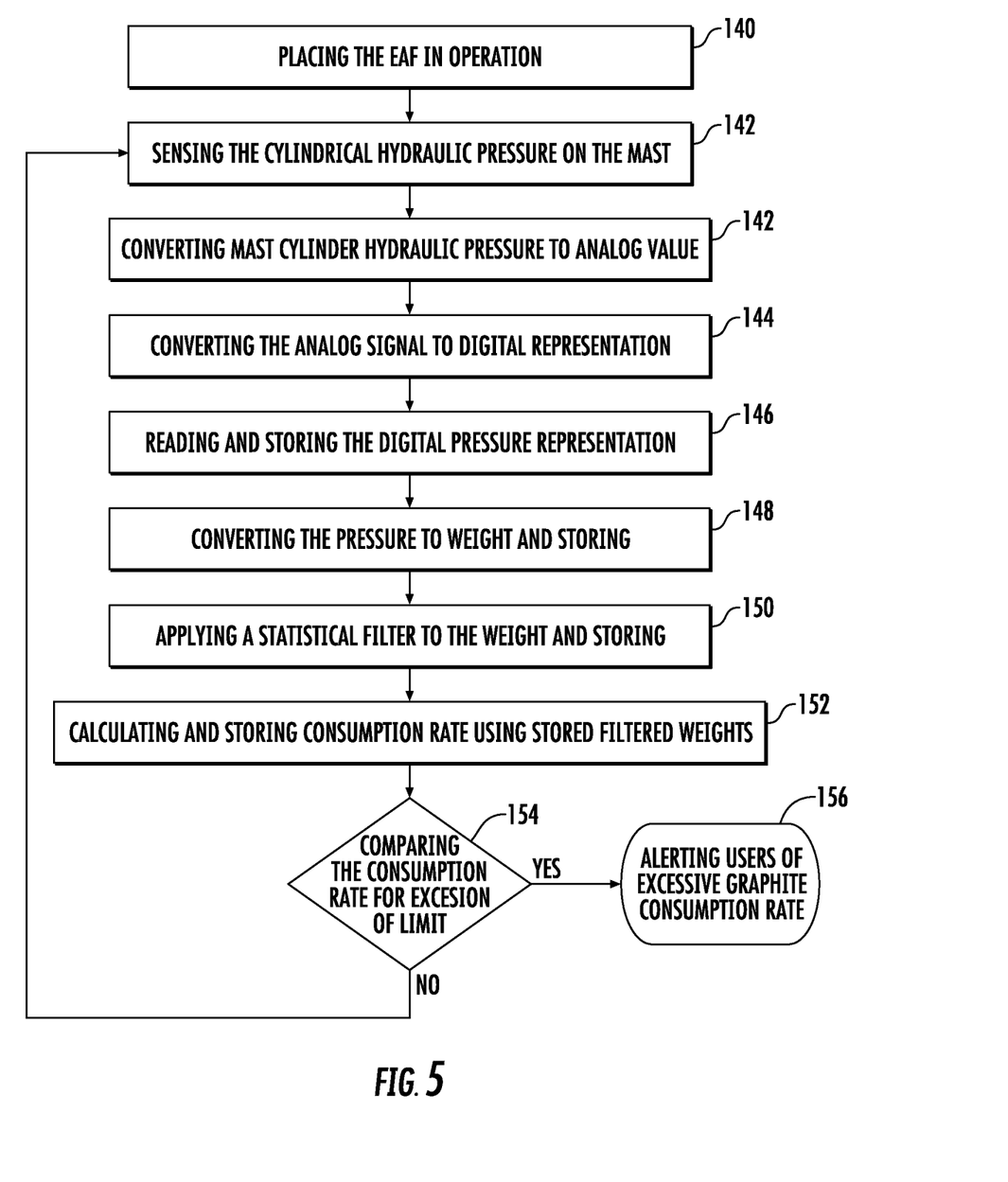
FIG. 5 illustrates a method according to an example of the disclosure.

FIG. 5 illustrates the steps of the method as discussed above. At step 140 the EAF 102 (FIG. 2) is placed in operation and the graphite electrodes 108, 110, and 112 are lowered into the refractory lined vessel 114 (FIG. 2). At step 142 the pressure transducer 128 senses the cylinder hydraulic pressure on the mast 116 for the graphite electrode 108. At step 144 the cylinder hydraulic pressure is converted to an analog value. The analog signal is then converted to a digital representation at step 144. The digital pressure representation is then read and stored by the computing device 130 (FIG. 2) at step 146. The digital pressure representation is converted to a weight of the graphite electrode 108 (FIG. 1) at step 148 that is stored in the computing device.

A statistical filter is applied to the stored weights to derive an instantaneous weight at step 150 that is then stored in the computing device 130 (FIG. 2). At step 152 a further statistical filter is applied to the instantaneous weights to derive the instantaneous rate of change (consumption) of the graphite electrode 108 that is then stored in the computing device 130 (FIG. 2). At step 154 the consumption rate is compared to the consumption rate of a normalized graphite electrode. Therefore, at any point in time during operations there is an expected consumption rate based on the normalized graphite electrode.

At step 154 if the calculated consumption rate exceeds the desired consumption rate then at step 156 the EAF system 100 notifies users by displaying an alert on a user display, sending an email, displaying an alert on a web page, a combination of these or some other suitable notification of the excessive consumption rate and the method repeats itself. Also, as discussed above this method is performed for each of the three electrodes 108, 110, 112, (FIG. 2) as means to detect defective graphite electrodes that have been received. Once the operators are aware of the defective electrodes, the quality thereof can be addressed with the vendors to ensure delivery of quality electrodes with proper consumption rates that permit the plant to contain operating costs.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for continuous estimation an instantaneous weight of a graphite electrode being consumed in an electric arc furnace, the method comprising the steps of:
   continuously sensing a hydraulic pressure acting on a mast holding the graphite electrode;
   converting each one of the sensed hydraulic pressures to a corresponding weight of the graphite electrode;
   determining from the corresponding weights of the graphite electrode the instantaneous weight of the graphite electrode.

2. The method of claim 1, including the step of storing in a computing device the corresponding weights of the graphite electrode.

3. The method of claim 2, including the step of storing in the computing device the instantaneous weights of the graphite electrode.

4. The method of claim 3, including the step of determining an instantaneous rate of change of the weight of the graphite electrode based upon the stored instantaneous weights the graphite electrode.

5. The method of claim 4, including the step of comparing the instantaneous rate of change of the weight of the graphite electrode to a limit to detect a potential defect of the graphite electrode.

6. The method of claim 5, including the step of providing external notification to an operator if the instantaneous rate of change of the graphite electrode weight exceeds the limit.

7. The method of claim 5, wherein the limit is based upon a normalized rate of electrode consumption.

8. The method of claim 7, wherein exceeding the limit identifies the potential defect in the graphite electrode.

9. The method of claim 4, including the step of storing in the computing device the instantaneous rates of change of the graphite electrode in the computing device.

10. The method of claim 4, wherein the step of determining the instantaneous rate of change of the weight of the graphite electrode includes applying a statistical filter to continuously derive the instantaneous rate of change of the stored graphite electrode weights.

11. The method of claim 10, including the steps of:
    displaying to a local user the instantaneous rate of change of the graphite electrode,
    communicating from the computing device to an offsite third party network the instantaneous rate of change of the graphite electrode for display on a digital interface of the third party network.

12. The method of claim 11, including the step of displaying to the local user the instantaneous weight of the graphite electrode, communicating from the computing device to an offsite third party network the instantaneous weight of the graphite electrode for display on a digital interface of the third party network.

13. The method of claim 2, including the step of applying a statistical filter to the stored corresponding weights of the graphite electrode to continuously derive the instantaneous weight of the graphite electrode.

14. The method of claim 13, including the step of calculating the amount of graphite electrode consumption from the stored instantaneous graphite electrode weights.

15. The method of claim 14, wherein the step of calculating the amount of graphite electrode consumption is derived from the stored instantaneous graphite electrode weights between two time periods.

16. The method of claim 15, including the steps of storing in the computing device the instantaneous rates of change and displaying to a local user the instantaneous rates of change a digital display in communication with the computing device.

17. The method of claim 13, wherein the step of applying the statistical filter to the stored corresponding weights of the graphite electrode to continuously derive the instantaneous weight of the graphite electrode comprises:
    selecting a sample of the graphite electrode weights from a time period during which each one of the sensed hydraulic pressures was converted to a corresponding weight of the graphite electrode;
    determining a central tendency of the graphite electrode weights from the sample, wherein the central tendency is the instantaneous weight of the graphite electrode;
    excluding from the determining the central tendency step increases in the weight of the graphite electrode;
    including in the determining the central tendency step only decreases in the weight of the graphite electrode.

18. The method of claim 1, wherein the graphite electrode is a first graphite electrode of three graphite electrodes in an alternating current electric arc furnace, the method including the further step of applying the method to each one of the three graphite electrodes.

19. An electric arc furnace (EAF) system comprising:
    an EAF;
    a graphite electrode for each phase of the EAF;
    a mast connected to the graphite electrode, the mast moveable vertically to raise and lower the at least one graphite electrode;
    a hydraulic cylinder including a fluid to raise and lower the mast;
    a pressure transducer continuously sensing a pressure of the fluid;
    a computing device configured to convert the continuously sensed pressure to a corresponding weight of the graphite electrode and to determine the instantaneous weight of the graphite electrode.

20. The EAF system of claim 19, wherein the computing device applies a statistical filter to continuously derive the instantaneous weight of each one of the graphite electrodes consumed in operation by the EAF.

21. The EAF system of claim 19, wherein the computing device applies a statistical filter to continuously derive the instantaneous rate of change of each one of the graphite electrodes consumed in operation by the EAF.

* * * * *